United States Patent
Kim et al.

(10) Patent No.: US 12,203,154 B2
(45) Date of Patent: Jan. 21, 2025

(54) COBALT-TUNGSTEN ALLOY AND METHOD OF FABRICATING THE SAME

(71) Applicant: Korea University Research and Business Foundation, Seoul (KR)

(72) Inventors: Young Keun Kim, Seoul (KR); Eun Min Yoo, Seoul (KR); Jun Hwan Moon, Seoul (KR); Yoo Sang Jeon, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 0 days.

(21) Appl. No.: 18/476,663

(22) Filed: Sep. 28, 2023

(65) Prior Publication Data
US 2024/0026496 A1 Jan. 25, 2024

Related U.S. Application Data

(62) Division of application No. 17/005,519, filed on Aug. 28, 2020, now abandoned.

(30) Foreign Application Priority Data

May 29, 2020 (KR) .......................... 10-2020-0065236

(51) Int. Cl.
*C25D 5/50* (2006.01)
*C22C 19/07* (2006.01)
(Continued)

(52) U.S. Cl.
CPC .............. *C22C 19/07* (2013.01); *C25D 3/562* (2013.01); *C25D 5/50* (2013.01); *B82Y 30/00* (2013.01); *B82Y 40/00* (2013.01)

(58) Field of Classification Search
CPC ......... C22C 19/07; B82Y 30/00; B82Y 40/00; C25D 1/006; C25D 1/04; C25D 1/22;
(Continued)

(56) References Cited

U.S. PATENT DOCUMENTS

| 6,680,540 B2 | 1/2004 | Nakano et al. |
| 2001/0030366 A1 | 10/2001 | Nakano et al. |
| 2014/0209469 A1 | 7/2014 | Scott et al. |

FOREIGN PATENT DOCUMENTS

| JP | 2008-69447 A | 3/2008 |
| JP | 2012-54306 A | 3/2012 |
| KR | 10-2016-0088548 A | 7/2016 |
| KR | 10-2088094 B1 | 3/2020 |

OTHER PUBLICATIONS

NPL-1, Tsyntsaru: Electrodeposition of Cobalt-Tungsten Alloys and their application for surface Engineering, Russian Journal of Electrochemistry, 2016, vol. 52, No. 11, pp. 1041-1047, (Year: 2016).*

(Continued)

*Primary Examiner* — Jie Yang
(74) *Attorney, Agent, or Firm* — NSIP Law

(57) ABSTRACT

Disclosed are a cobalt-tungsten alloy and a method of fabricating the same. More particularly, cobalt-tungsten alloy nanowires according to an embodiment are formed using an electroplating method, a grain structure of the cobalt-tungsten alloy nanowires is controlled according to the content of tungsten, and the electrical resistivity of the cobalt-tungsten alloy nanowires can be reduced through annealing.

10 Claims, 17 Drawing Sheets

(51) Int. Cl.
　　　*C25D 3/56*　　　(2006.01)
　　　*B82Y 30/00*　　(2011.01)
　　　*B82Y 40/00*　　(2011.01)

(58) Field of Classification Search
　　　CPC ....... C25D 3/562; C25D 5/50; H01L 2924/00; H01L 2224/743
　　　See application file for complete search history.

(56) References Cited

OTHER PUBLICATIONS

Tsyntsaru, N., et al., "Toward uniform electrodeposition of magnetic Co-W mesowires arrays: direct versus pulse current deposition." *Electrochimica Acta*, 188, 2016 (pp. 589-601).
Extended European Search Report issued on Feb. 18, 2021 in counterpart European Patent Application No. 20193449.4 (10 pages in English).
Vernickaite, E., et al., "A Hybrid Approach to Fabricated Nanowire-Nanoparticle Composites of a Co-W Alloy and Au Nanoparticles," *Journal of The Electrochemical Society*, 163, 7, 2016 (pp. 1-6).
Tsyntsaru, N., et al., "The effect of electrodeposition conditions and post-annealing on nanostructure of Co-W coatings," *Surface and Coatings Technology*, 206, 19-20, 2012 (pp. 4262-4269).
Tsyntsaru, Natalia. "Electrodeposition of cobalt-tungsten alloys and their application for surface engineering," *Russian Journal of Electrochemistry*, 52, 11, 2016 (pp. 1041-1047).
Japanese Office Action issued on Jul. 20, 2021 in counterpart Japanese Patent Application No. 2020-144598 (6 pages in Japanese).
Korean Office Action issued on Jul. 2, 2021 in counterpart Korean Patent Application No. 10-2020-0065236 (5 pages in Korean).

* cited by examiner

[FIG. 1]
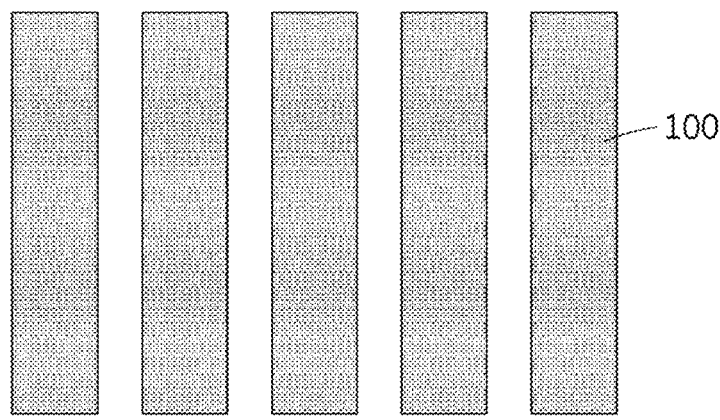
[FIG. 2]
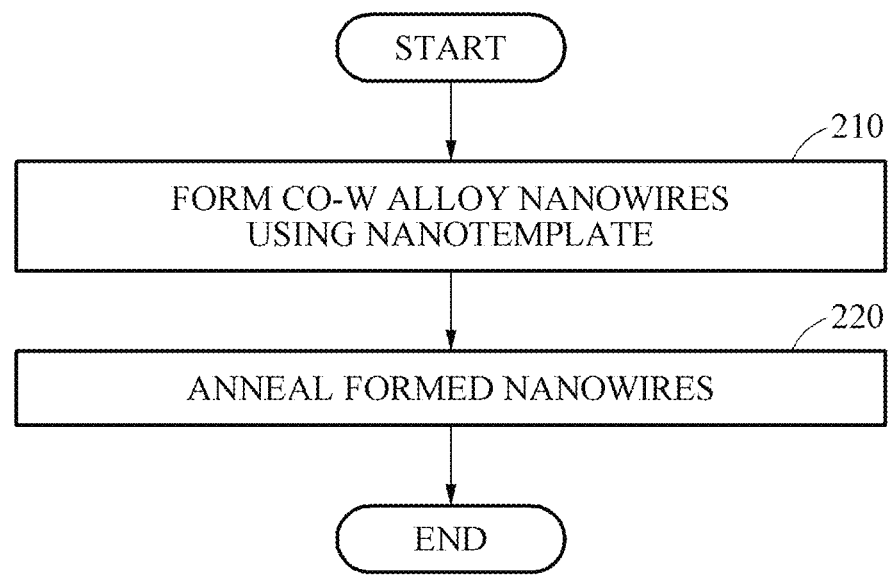

[FIG. 3A]
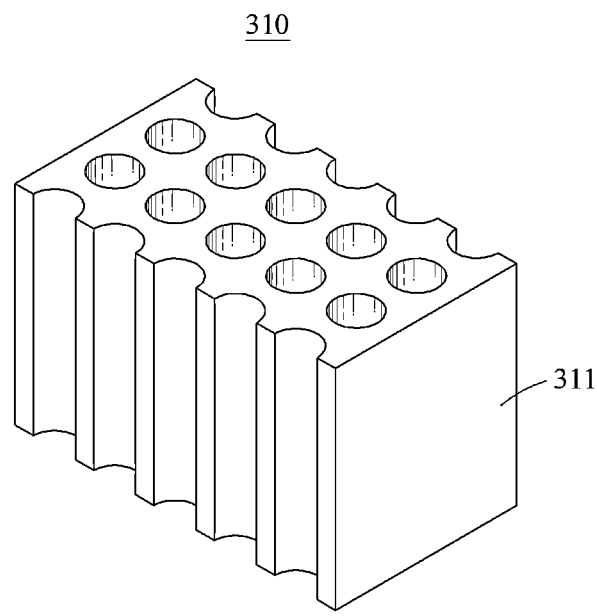
[FIG. 3B]
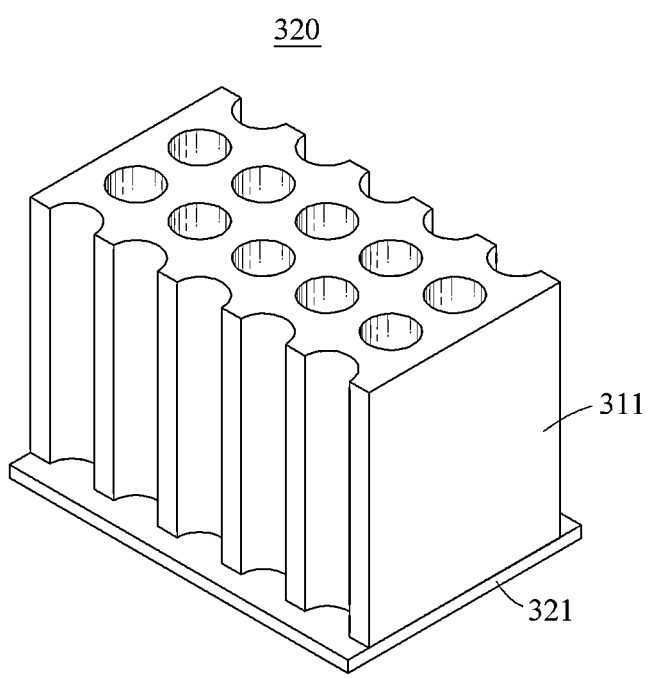

[FIG. 3C]
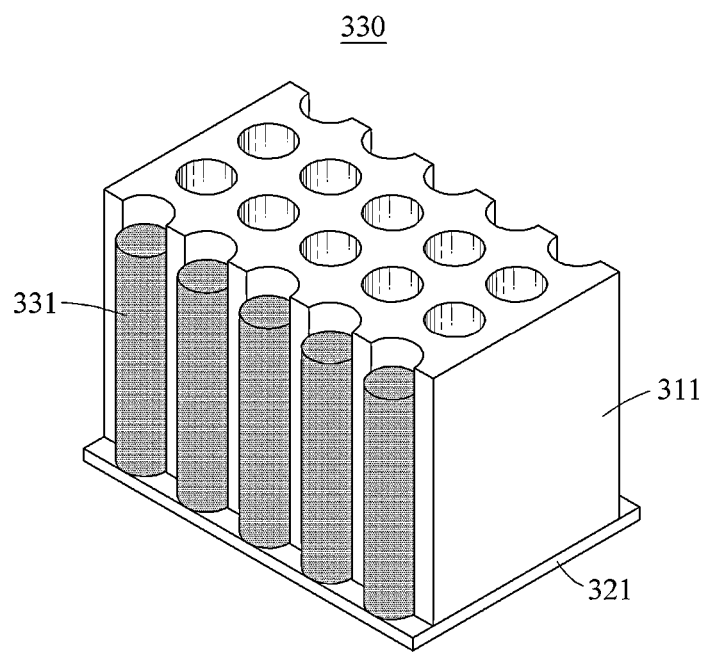
[FIG. 3D]
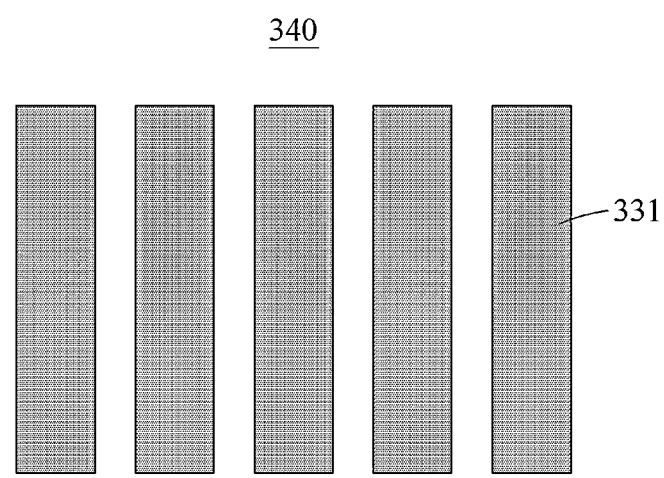

[FIG. 4A]
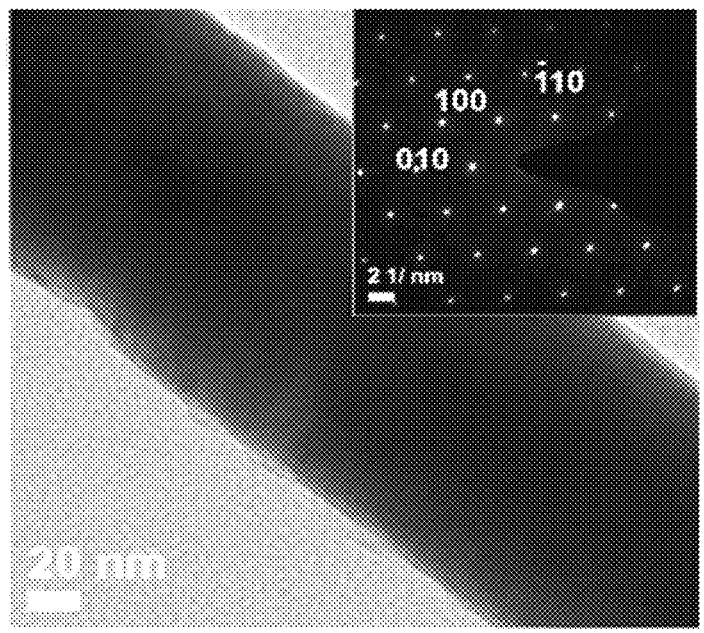
[FIG. 4B]
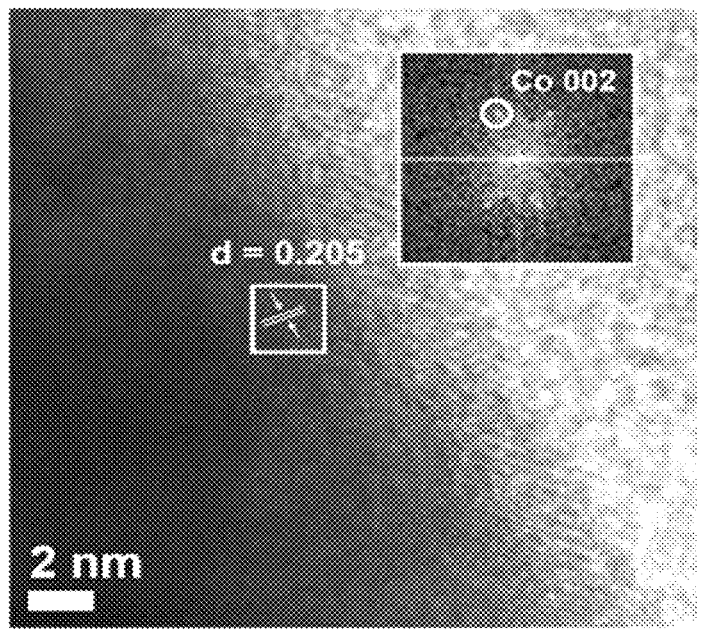

[FIG. 4C]
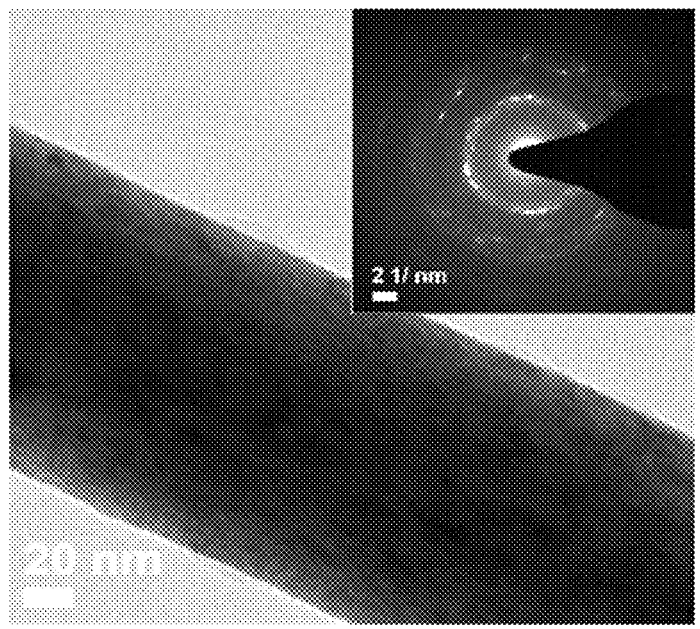
[FIG. 4D]
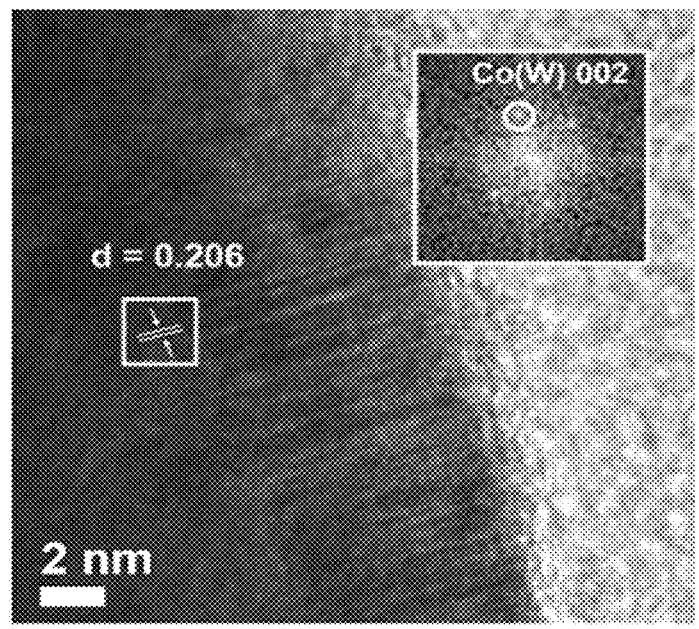

[FIG. 4E]
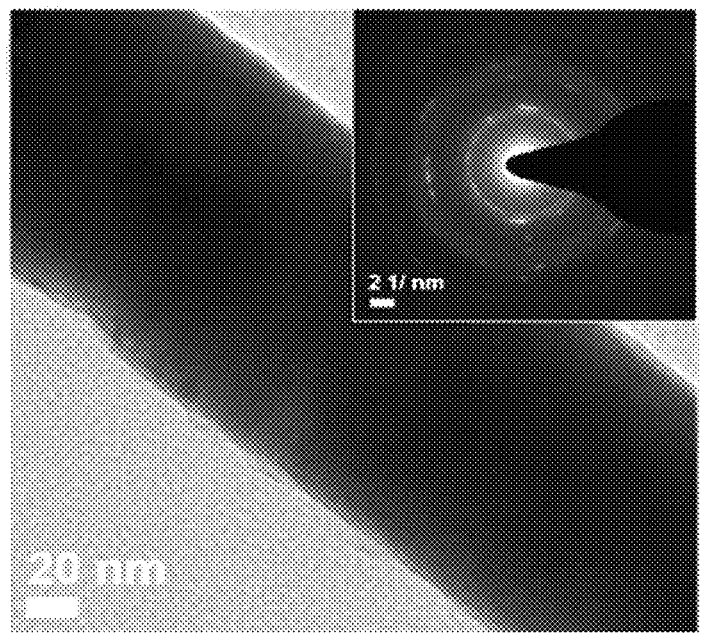
[FIG. 4F]
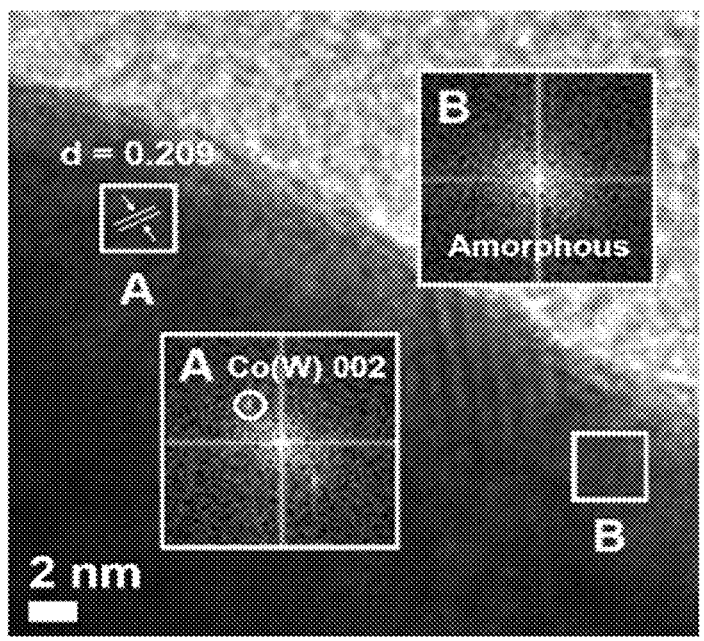

[FIG. 4G]
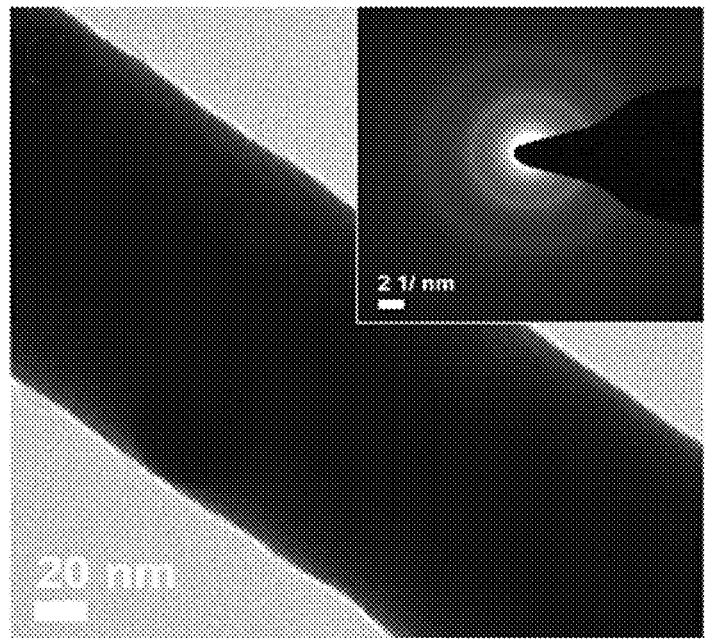
[FIG. 4H]
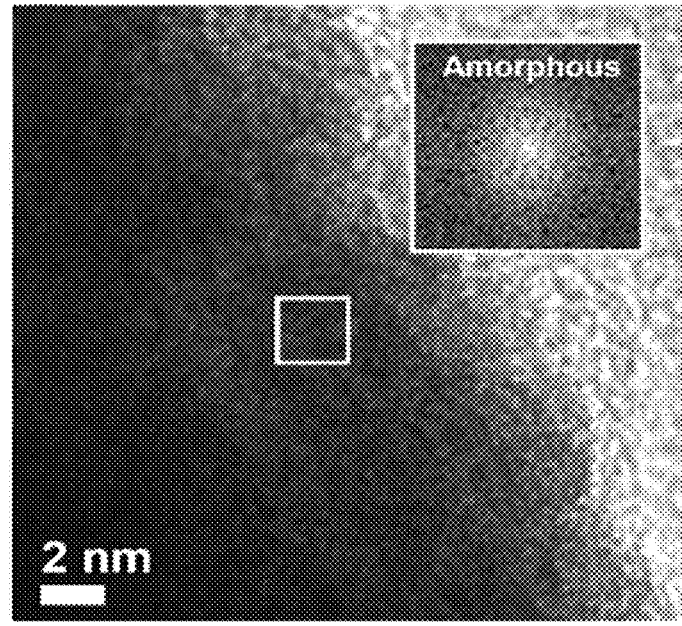

[FIG. 5A]
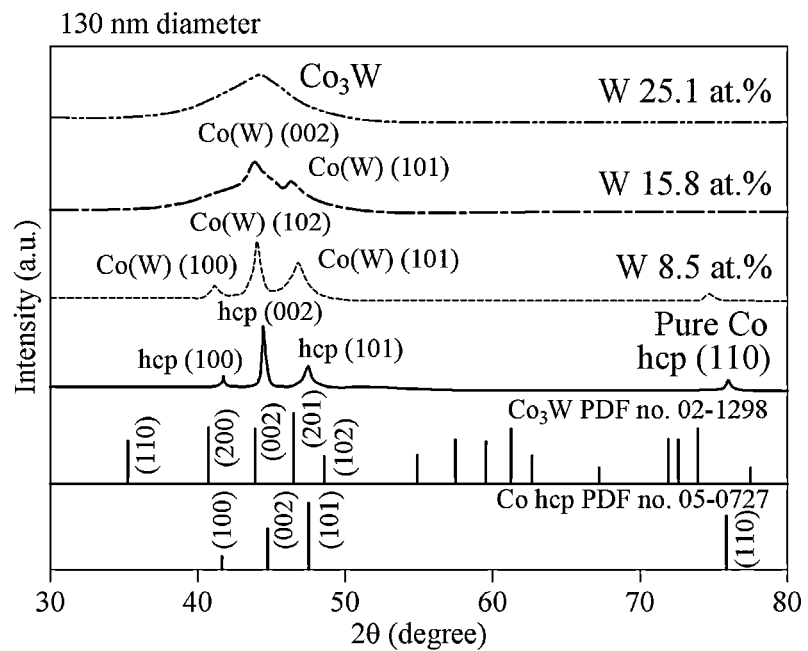
[FIG. 5B]
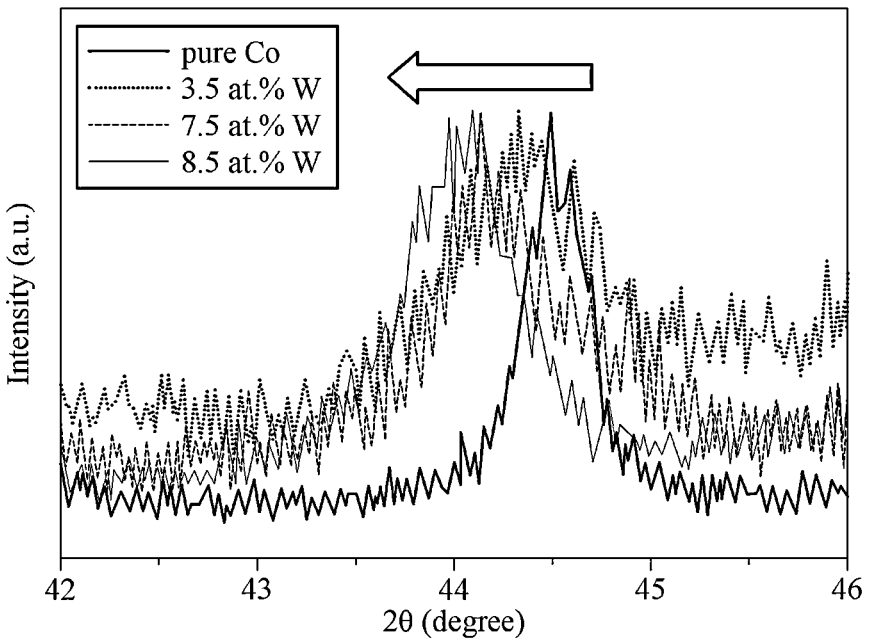

[FIG. 5C]
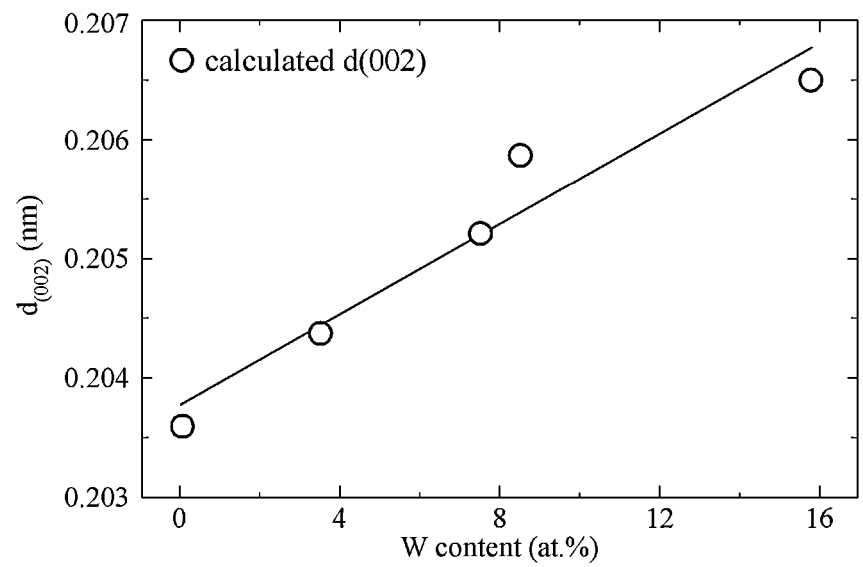
[FIG. 5D]
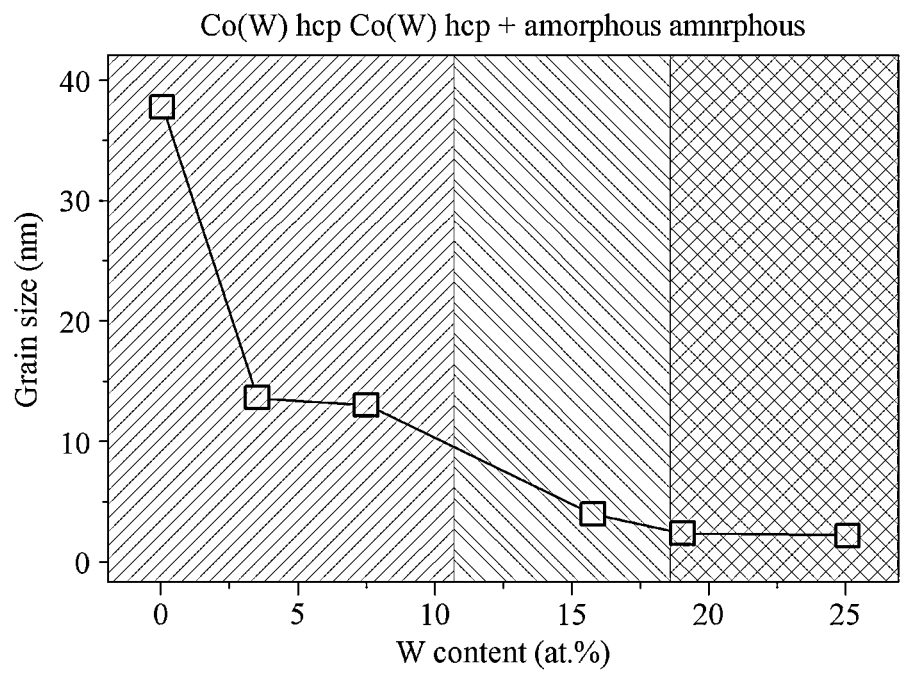

[FIG. 6A]
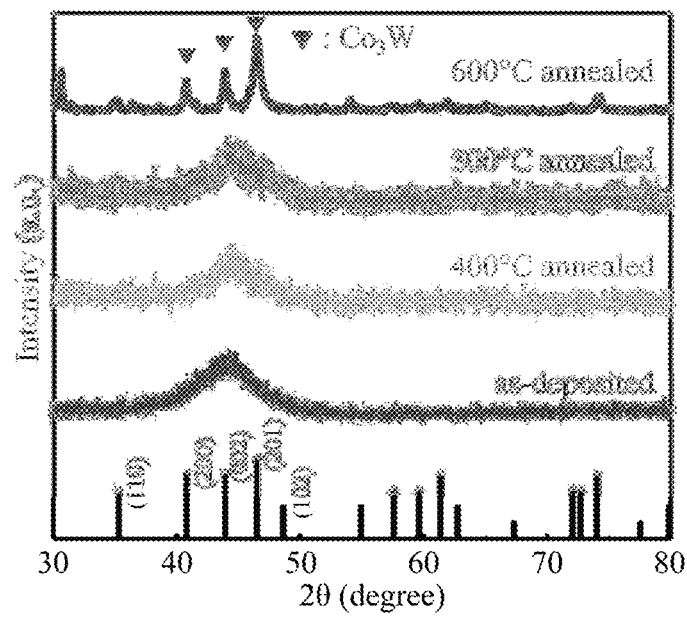
[FIG. 6B]
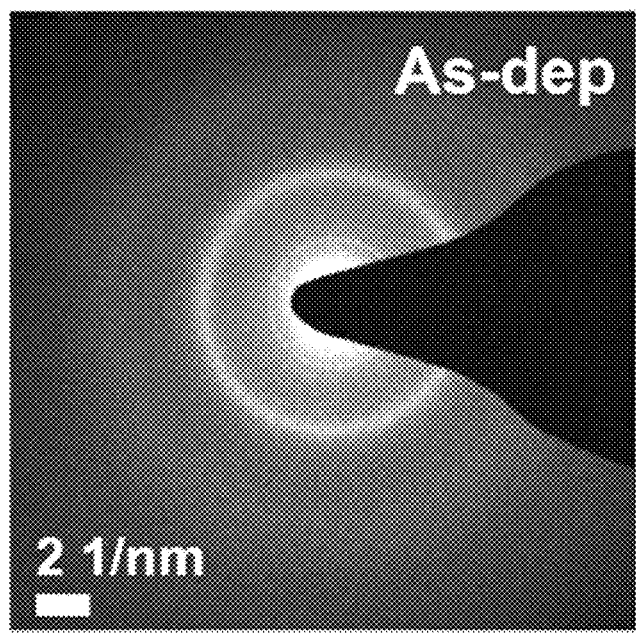

[FIG. 6C]
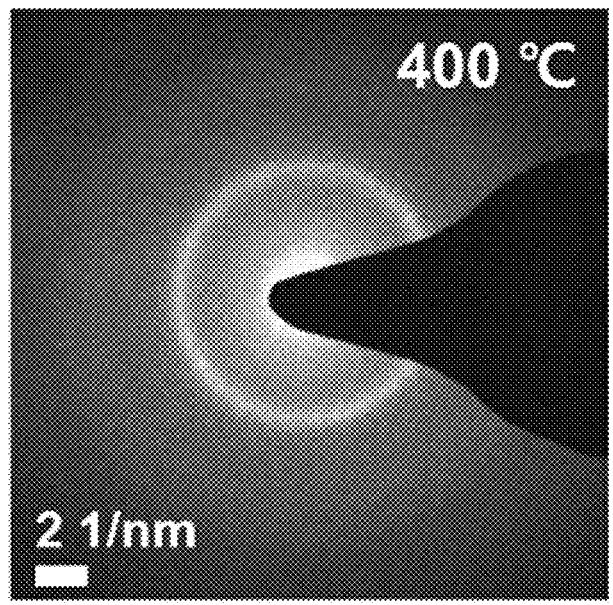
[FIG. 6D]
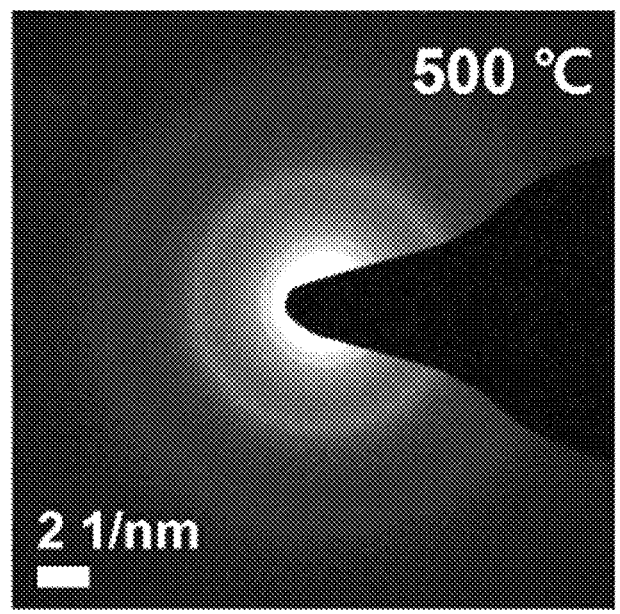

[FIG. 6E]
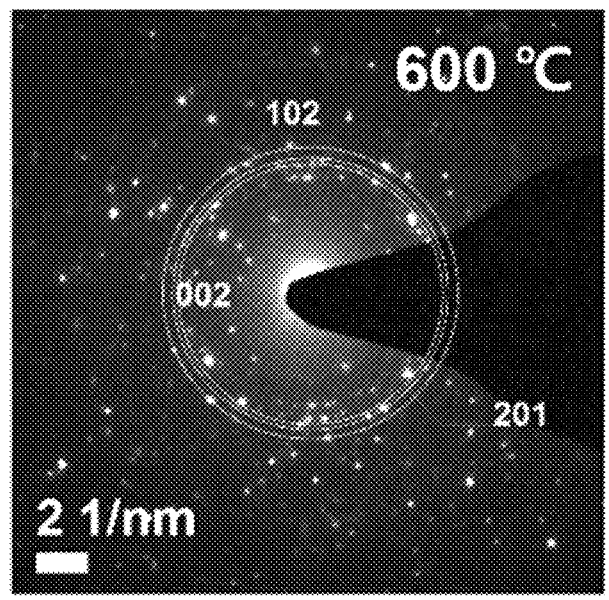
[FIG. 7A]
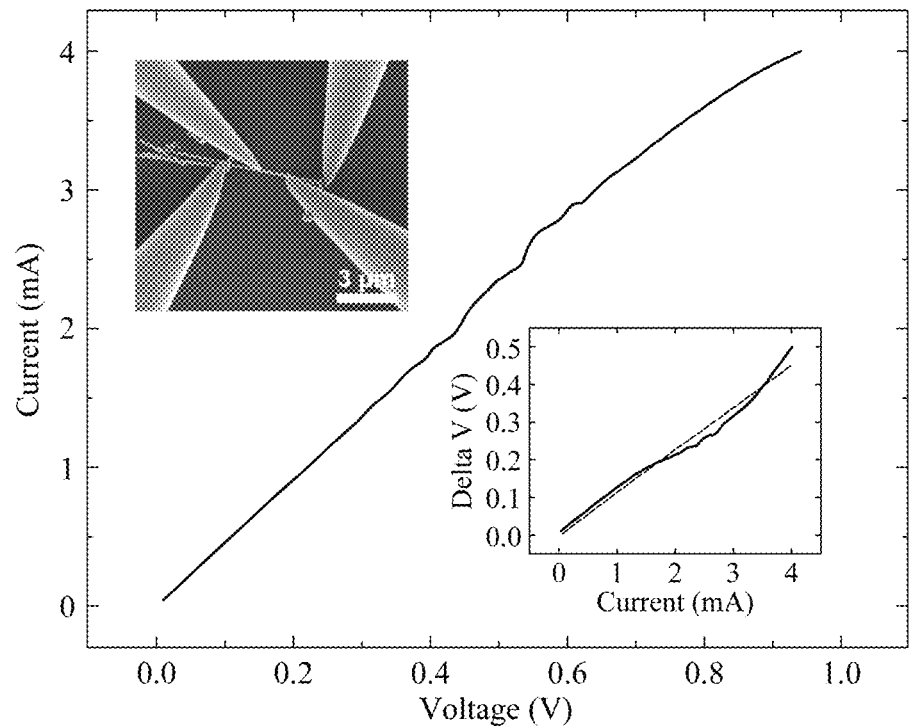

【FIG. 7B】
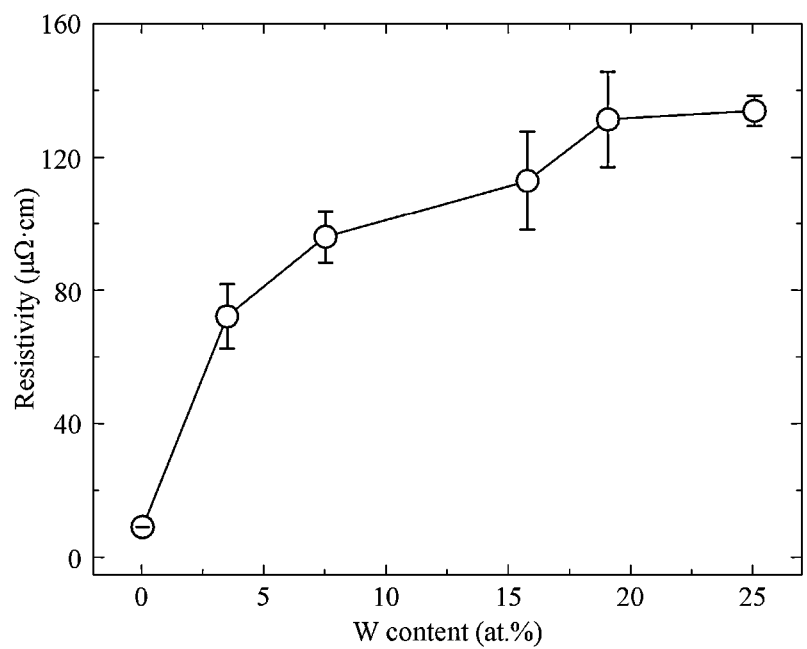
【FIG. 7C】
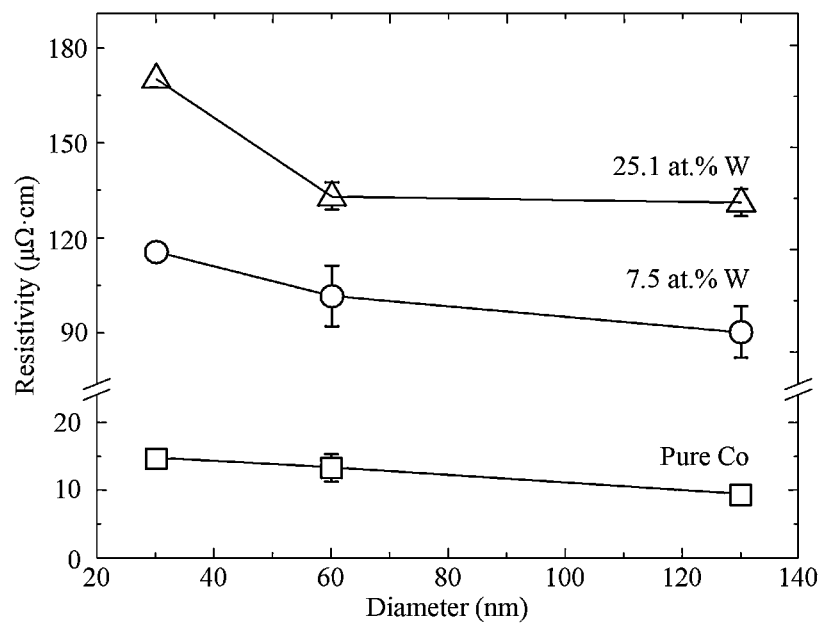

【FIG. 7D】
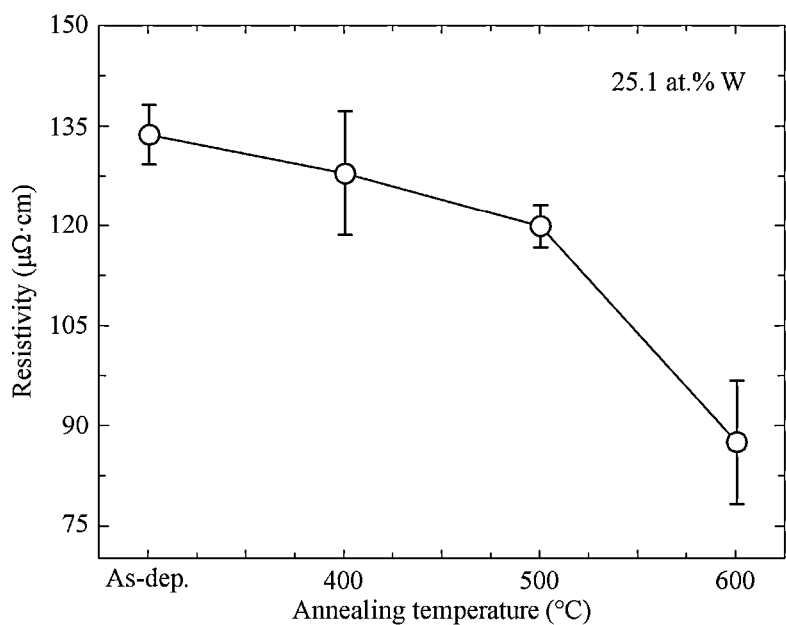

[FIG. 8A]
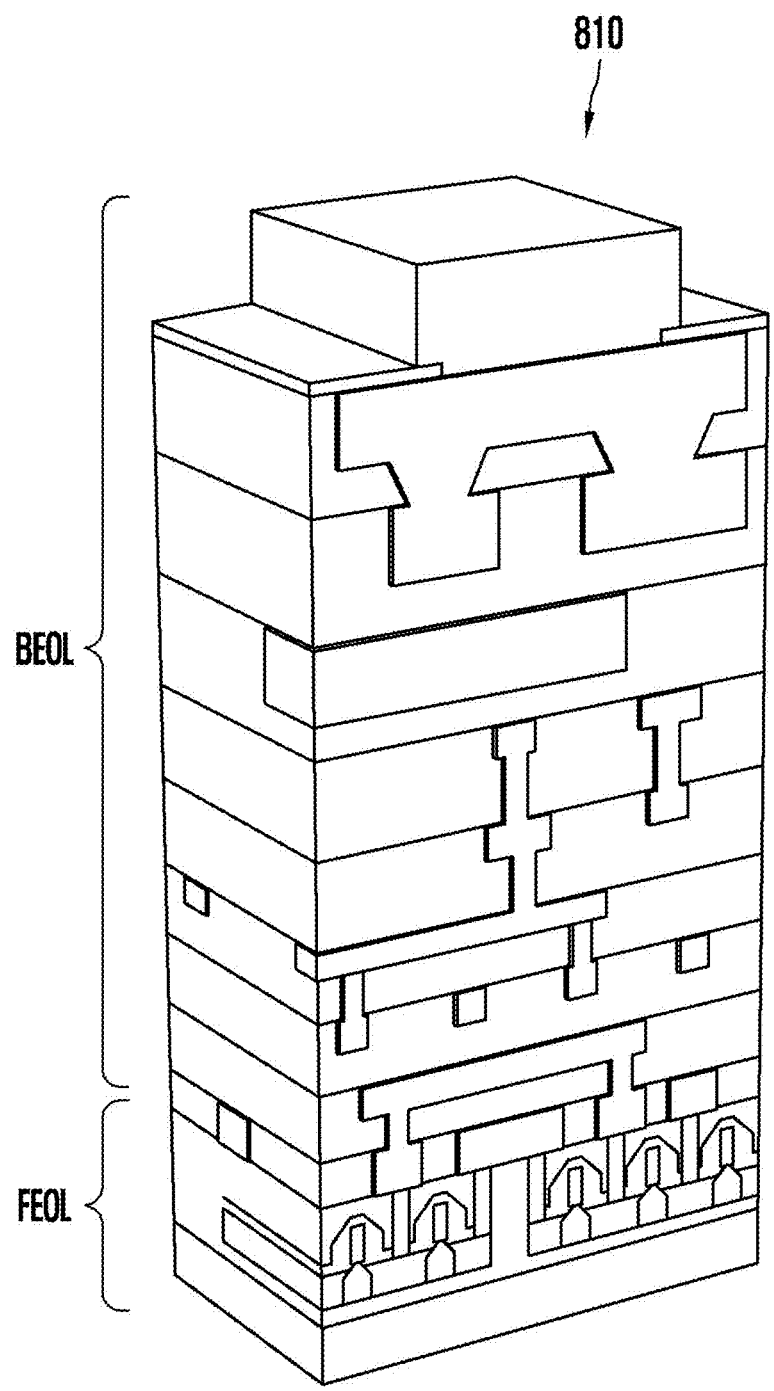

[FIG. 8B]
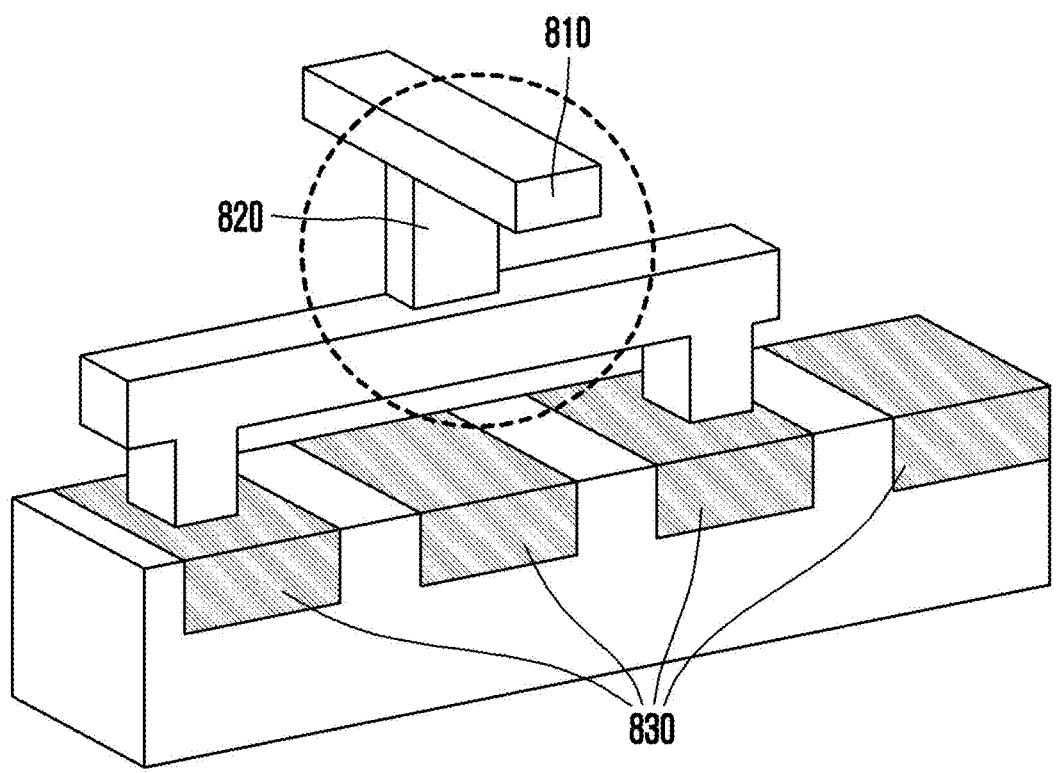

[FIG. 8C]
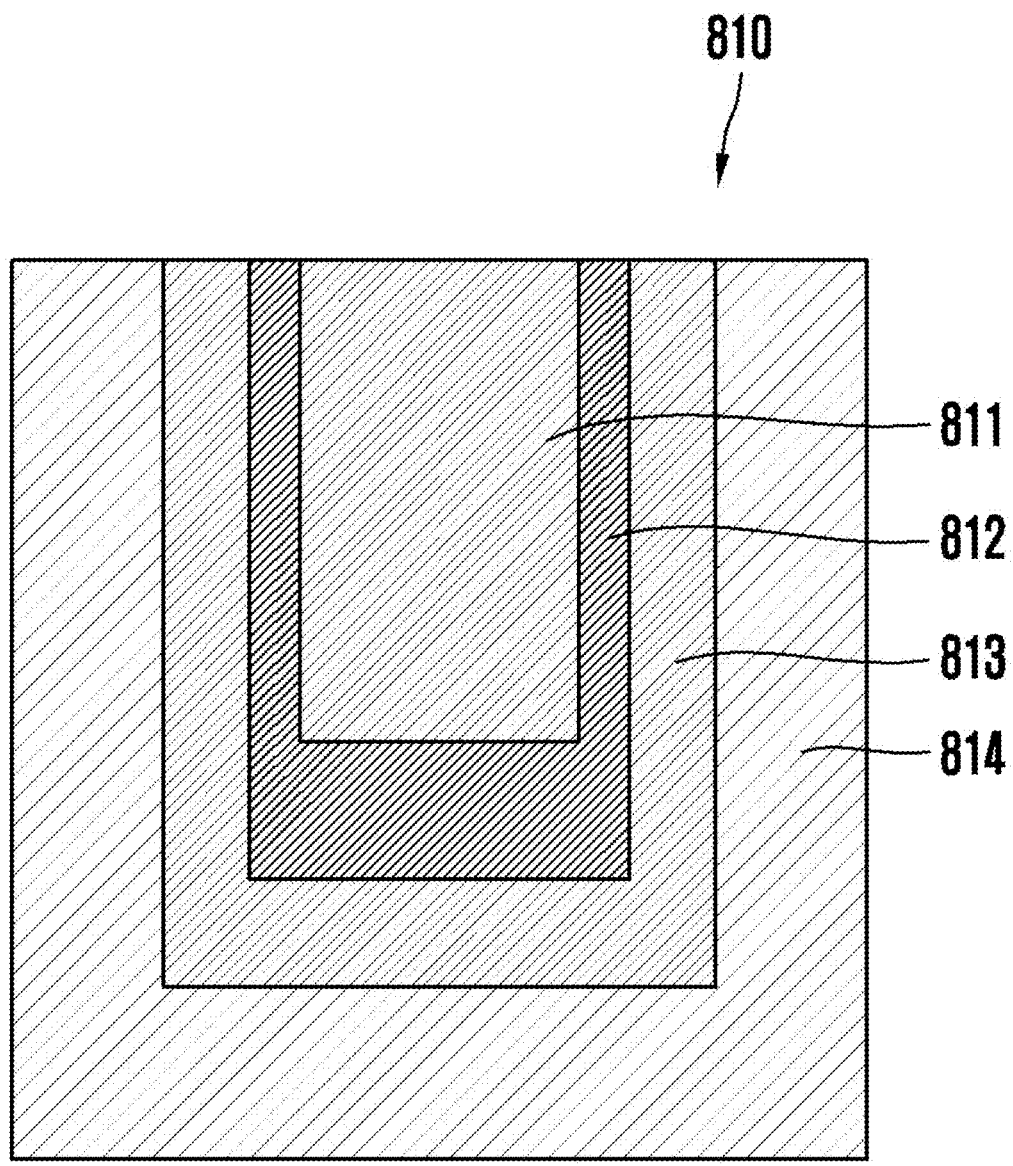

COBALT-TUNGSTEN ALLOY AND METHOD OF FABRICATING THE SAME

CROSS-REFERENCE TO RELATED APPLICATION

This application is divisional of U.S. patent application Ser. No. 17/005,519 filed on Aug. 28, 2020, which claims the benefit under 35 USC 119(a) of Korean Patent Application No. 10-2020-0065236, filed on May 29, 2020, in the Korean Intellectual Property Office, the entire disclosures of which are incorporated herein by reference for all purposes.

BACKGROUND OF THE DISCLOSURE

Field of the Disclosure

The present disclosure relates to a cobalt-tungsten alloy and a method of fabricating the same, and more particularly, to a technical idea of forming cobalt-tungsten alloy nanowires using an electroplating method.

Description of the Related Art

Copper (Cu) metallization, widely used in processes of fabricating integrated circuits including semiconductor devices, is realized through an electroplating process and a damascene process. Here, a TaN barrier for preventing diffusion into a low-k dielectric surrounding copper metal wiring; and a Ta liner for facilitating Cu plating are required.

A TaN/Ta double layer structure composed of a barrier layer and liner is important to achieve desired device lifespan, but has much higher electrical resistance than that of Cu metal wiring. In addition, in the case of the TaN/Ta double layer structure, there are difficulties in maintaining a constant thickness (step coverage) on a surface.

In addition, as the high integration of semiconductors is accelerated, rapid resistance increase in metal wiring negatively affects the entire device in terms of transistor speed, energy consumption, etc. In particular, the thickness of a barrier/liner has reached the limit and thus causes most of wiring resistance.

RELATED ART DOCUMENT

Patent Document

Korean Patent No. 10-2088094, "NANOSCALE METAL NANOWIRES AND METHOD OF FABRICATING THE SAME"

SUMMARY OF THE DISCLOSURE

Therefore, the present disclosure has been made in view of the above problems, and it is one object of the present disclosure to provide a cobalt-tungsten alloy capable of forming cobalt-tungsten alloy nanowires having an amorphous structure and low electrical resistivity using an electroplating method; and a method of fabricating the same.

It is another object of the present disclosure to provide a cobalt-tungsten alloy that serves as a barrier for preventing diffusion into a low-k dielectric of metal wiring and a liner for metal wiring plating and, accordingly, is used in the form of a single layer in a metal wiring process; and a method of fabricating the same.

In accordance with an aspect of the present disclosure, the above and other objects can be accomplished by the provision of cobalt-tungsten alloy nanowires, wherein the cobalt-tungsten alloy nanowires are formed using an electroplating method, a grain structure of the cobalt-tungsten alloy nanowires is controlled according to a content of tungsten, and electrical resistivity of the cobalt-tungsten alloy nanowires is reduced through annealing.

According to an embodiment, a cobalt-tungsten intermetallic compound may be formed through the annealing and thus the electrical resistivity may be reduced.

According to an embodiment, the intermetallic compound may appear at $2\theta$ of $40.70°\pm0.3°$, $43.88°\pm0.3°$ and $46.46°\pm0.3°$ during x-ray diffraction (XRD) analysis.

According to an embodiment, the annealing may be performed at 25° C. to 600° C.

According to an embodiment, the grain structure may be controlled to have an amorphous-like structure when the content of tungsten is 25.1 at. %.

According to an embodiment, the grain structure may be controlled to have a mixed structure including an amorphous-like structure and a polycrystalline structure when the content of tungsten is 15.8 at. % to 19.1 at. %.

According to an embodiment, the content of tungsten may be controlled by adjusting at least one of a tungsten precursor concentration and a current density.

According to an embodiment, the cobalt-tungsten alloy nanowires may be formed by the electroplating method of using a deionized water-based solution including precursors, cobalt sulfate heptahydrate ($CoSO_4 \cdot 7H_2O$) and sodium tungstate heptahydrate ($Na_2WO_4 \cdot 7H_2O$).

According to an embodiment, the deionized water-based solution may further include boric acid ($H_3BO_3$) and citric acid ($C_6H_8O_7$), as buffers, and sodium citrate tribasic dihydrate ($C_6H_7Na_3O_8$) as an additive.

According to an embodiment, the cobalt-tungsten alloy nanowires may be applied in the form of at least one of a barrier and a liner with respect to at least one of a via, contact and metal line included in a back end of line (BEOL) layer of a semiconductor device.

According to an embodiment, the cobalt-tungsten alloy nanowires may be applied in the form of the barrier and the liner on a metal layer of the metal line.

In accordance with another aspect of the present invention, there is provided a method of fabricating cobalt-tungsten alloy nanowires, the method including: forming cobalt-tungsten (Co—W) alloy nanowires on a nanotemplate using an electroplating method; and annealing the formed alloy nanowires, wherein, in the forming, a grain structure of the alloy nanowires is controlled according to a content of tungsten.

According to an embodiment, in the annealing, a cobalt-tungsten intermetallic compound may be formed through the annealing and thus electrical resistivity may be reduced.

According to an embodiment, the annealing may be performed at 25° C. to 600° C.

According to an embodiment, in the forming, the content of tungsten may be adjusted to 25.1 at. % to control the grain structure of the alloy nanowires to have an amorphous-like structure.

According to an embodiment, in the forming, the content of tungsten may be adjusted to 15.8 at. % to 19.1 at. % to control the grain structure of the alloy nanowires to have an amorphous-like structure.

According to an embodiment, in the forming, the cobalt-tungsten alloy nanowires may be formed using the electroplating method in an environment in which a current density of 1.25 mA/cm2 to 5.00 mA/cm2 is applied to simultaneously reduce cobalt and the tungsten.

According to an embodiment, in the forming, a precursor concentration of the tungsten may be adjusted to 0.20 mol L-1 and a current density may be adjusted to 5.00 mA/cm2 to control the content of tungsten.

According to an embodiment, the nanotemplate may include a polycarbonate membrane (PCM) or anodic aluminum oxide (AAO) and at least one nano-porous track may be formed in the nanotemplate.

According to an embodiment, the method of fabricating cobalt-tungsten alloy nanowires may further include separating the annealed alloy nanowires from the nanotemplate.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 illustrates cobalt-tungsten alloy nanowires according to an embodiment;

FIG. 2 illustrates a method of fabricating cobalt-tungsten alloy nanowires according to an embodiment;

FIGS. 3A to 3D illustrate an example of a method of fabricating cobalt-tungsten alloy nanowires according to an embodiment;

FIGS. 4A to 4H illustrate HRTEM and SAED images of cobalt-tungsten alloy nanowires according to an embodiment;

FIGS. 5A to 5D illustrate XRD analysis results of cobalt-tungsten alloy nanowires according to an embodiment;

FIGS. 6A to 6E illustrate annealing temperature-dependent crystallinity characteristic changes of cobalt-tungsten alloy nanowires according to an embodiment;

FIGS. 7A to 7D illustrate electrical property changes dependent upon compositions, nanowire diameters and annealing temperature of cobalt-tungsten alloy nanowires according to an embodiment; and FIGS. 8A to 8C illustrate an application example of cobalt-tungsten alloy nanowires according to an embodiment.

DETAILED DESCRIPTION OF THE DISCLOSURE

The embodiments will be described in detail herein with reference to the drawings.

However, it should be understood that the present disclosure is not limited to the embodiments according to the concept of the present disclosure, but includes changes, equivalents, or alternatives falling within the spirit and scope of the present disclosure.

In the following description of the present disclosure, a detailed description of known functions and configurations incorporated herein will be omitted when it may make the subject matter of the present disclosure unclear.

The terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), it may be directly connected or coupled to the other element or an intervening element (e.g., third) may be present.

As used herein, "configured to" may be used interchangeably with, for example, "suitable for", "ability to", "changed to", "made to", "capable of", or "designed to" in terms of hardware or software.

In some situations, the expression "device configured to" may mean that the device "may do ~" with other devices or components.

For example, in the sentence "processor configured to perform A, B, and C", the processor may refer to a general purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or".

That is, unless otherwise mentioned or clearly inferred from context, the expression "x uses a or b" means any one of natural inclusive permutations.

In the above-described specific embodiments, elements included in the invention are expressed singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present disclosure has been described with reference to exemplary embodiments, but it should be understood that various modifications may be made without departing from the scope of the present disclosure.

Therefore, the scope of the present disclosure should not be limited by the embodiments, but should be determined by the following claims and equivalents to the following claims.

FIG. 1 illustrates cobalt-tungsten alloy nanowires according to an embodiment.

Referring to FIG. 1, the cobalt-tungsten alloy nanowires according to an embodiment are formed by an electroplating method, thereby having an amorphous structure and relatively low electrical resistivity.

In addition, the cobalt-tungsten alloy nanowires according to an embodiment serve as a barrier for preventing diffusion into a low-k dielectric of metal wiring and a liner for metal wiring plating, thereby being used as a single layer in a metal wiring process.

In particular, the cobalt-tungsten alloy nanowires 100 according to an embodiment may be formed using an electroplating method, a grain structure thereof may be controlled according to the content of tungsten, and electrical resistivity may be reduced through annealing.

According to an embodiment, in the case of the cobalt-tungsten alloy nanowires 100, a cobalt-tungsten intermetallic compound may be formed through annealing, thereby reducing electrical resistivity.

According to an embodiment, intermetallic compounds may appear at 2θ of 40.700±0.3°, 43.880±0.3° and 46.460±0.3° when analyzing X-ray diffraction (XRD). Here, intermetallic compounds may correspond to XRD peak positions derived during XRD analysis.

The intermetallic compounds of the cobalt-tungsten alloy nanowires 100 according to an embodiment will be described in detail below with reference to FIG. 6.

According to an embodiment, annealing may be performed at 25° C. to 600° C. For example, cobalt-tungsten alloy nanowires may be annealed and formed at a temperature of less than 600° C. when used as a barrier, and may be annealed and formed at 600° C. when used as a liner.

According to an embodiment, a grain structure of the cobalt-tungsten alloy nanowires 100 may be controlled to have an amorphous-like structure when the content of tungsten is 25.1 at. %.

In addition, a grain structure of the cobalt-tungsten alloy nanowires 100 may be controlled to have a mixed structure including an amorphous-like structure and a polycrystalline structure when the content of tungsten is 15.8 at. % to 19.1 at. %.

Here, since a grain size of the amorphous-like structure is formed as small as that of an amorphous structure, the amorphous-like structure may be a nano-crystalline structure exhibiting the same characteristics as an amorphous structure.

According to an embodiment, in the case of the cobalt-tungsten alloy nanowires 100, at least one of a tungsten precursor concentration and a current density may be controlled to control the content of tungsten.

For example, the cobalt-tungsten alloy nanowires 100 may be formed by an electroplating method using a deionized water-based solution including cobalt sulfate heptahydrate ($CoSO_4 \cdot 7H_2O$) and sodium tungstate heptahydrate ($Na_2WO_4 \cdot 7H_2O$) which are precursors.

In addition, the deionized water-based solution may further include boric acid ($H_3BO_3$) and citric acid ($C_6H_8O_7$) as buffers; and sodium citrate tribasic dihydrate ($C_6H_7Na_3O_8$) as an additive.

The cobalt-tungsten alloy nanowires according to an embodiment will be described in more detail below with reference to FIGS. 2 to 7.

FIG. 2 illustrates a method of fabricating cobalt-tungsten alloy nanowires according to an embodiment.

In other words, FIG. 2 illustrates a method of fabricating the cobalt-tungsten alloy nanowires according to the embodiment described with reference to FIG. 1, and thus, contents described in FIG. 1 are omitted in describing FIG. 2.

Referring to FIG. 2, the method of fabricating cobalt-tungsten alloy nanowires according to an embodiment uses an electroplating method, thereby being capable of providing cobalt-tungsten alloy nanowires having an amorphous structure and low electrical resistivity.

In addition, the method of fabricating cobalt-tungsten alloy nanowires according to an embodiment may provide cobalt-tungsten alloy nanowires that serve as a barrier for preventing diffusion into a low-k dielectric of metal wiring and a liner for metal wiring plating and thus is capable of being used as a single layer in a metal wiring process.

Recently, research and development of a new process using scaling boosters and various materials has been actively conducted, among which a cobalt (Co)-based alloy-based single layer has been identified as a promising material that can replace a TaN/Ta double layer structure having a high specific resistance value.

Accordingly, the method of fabricating cobalt-tungsten alloy nanowires according to an embodiment employs a single layer-alloying approach to replace an existing double layer structure. The single layer-alloying approach allows realization of an amorphous structure or a grain stuffing effect, thereby being capable of improving barrier properties. In addition, the amorphous structure allows removal of diffusion paths through grain boundaries, thereby being capable of exhibiting excellent anti-diffusion properties.

In addition, the single-layer alloy material of the cobalt-tungsten alloy nanowires according to an embodiment may have a lower electrical resistivity value than nitride (TaN, resistivity: 160-400 μΩ·cm) while reducing interface resistance caused by a multi-layer structure.

According to FIG. 2, in step 210 of the method of fabricating cobalt-tungsten alloy nanowires according to an embodiment, cobalt-tungsten (Co—W) alloy nanowires may be formed on a nanotemplate using an electroplating method.

For example, the cobalt-tungsten alloy nanowires formed using an electroplating method may be represented by $Co_{100-x}W_x$, where the content x of tungsten may be 0 at. %<x≤25.1 at. %.

In addition, the nanotemplate may include a polycarbonate membrane (PCM) or anodic aluminum oxide (AAO), and at least one nano-porous track may be formed therein. Here, the nano-porous track may be a region where cobalt-tungsten alloy nanowires are deposited through electroplating.

According to an embodiment, in step 210 of the method of fabricating cobalt-tungsten alloy nanowires, cobalt-tungsten alloy nanowires may be formed on the nanotemplate by an electroplating method using a deionized water-based solution including cobalt sulfate heptahydrate ($CoSO_4 \cdot 7H_2O$; 0.20 M) and sodium tungstate heptahydrate ($Na_2WO_4 \cdot 7H_2O$; 0.10 or 0.20 M) which are precursors.

In addition, a deionized water-based solution may further include boric acid ($H_3BO_3$; 0.65 M) and citric acid ($C_6H_8O_7$; 0.04 M), which are buffers, and sodium citrate tribasic dihydrate ($C_6H_7Na_3O_8$; 0.25 or 0.50 M) which is an additive.

Meanwhile, in step 210 of the method of fabricating cobalt-tungsten alloy nanowires according to an embodiment, a grain structure of the alloy nanowires may be controlled according to the content of tungsten.

According to an embodiment, in step 210 of the method of fabricating cobalt-tungsten alloy nanowires, the grain structure of the alloy nanowires may be controlled to have an amorphous-like structure by controlling the content of tungsten to 25.1 at. %.

In addition, in step 210 of the method of fabricating cobalt-tungsten alloy nanowires according to an embodiment, the grain structure of the alloy nanowires may be controlled to have a mixed structure including an amorphous-like structure and a polycrystalline structure by controlling the content of tungsten to 15.8 at. % to 19.1 at. %.

Preferably, in step 210 of the method of fabricating cobalt-tungsten alloy nanowires according to an embodiment, the grain structure of the alloy nanowires may be controlled to have an amorphous-like structure by controlling the content of tungsten to 25.1 at. %.

That is, by the method of fabricating cobalt-tungsten alloy nanowires according to an embodiment, cobalt-tungsten alloy nanowires having an amorphous structure may be formed by controlling the content of tungsten.

According to an embodiment, in step 210 of the method of fabricating cobalt-tungsten alloy nanowires according to an embodiment, the content of tungsten may be controlled by controlling at least one of a tungsten precursor concentration and a current density.

In other words, in step 210 of the method of fabricating cobalt-tungsten alloy nanowires according to an embodiment, the content of tungsten may be controlled by controlling the concentration of a tungsten precursor solution and a current density in a process of forming cobalt-tungsten alloy nanowires using an electroplating method.

For example, in step 210 of the method of fabricating cobalt-tungsten alloy nanowires according to an embodiment, cobalt-tungsten alloy nanowires may be formed using an electroplating method in an environment in which a current density of 1.25 mA/cm$^2$ to 5.00 mA/cm$^2$ is applied to simultaneously reduce cobalt and tungsten.

In step 220 of the method of fabricating cobalt-tungsten alloy nanowires according to an embodiment, the formed alloy nanowires may be annealed.

According to an embodiment, in step 220 of the method of fabricating cobalt-tungsten alloy nanowires according to an embodiment, the formed alloy nanowires may be separated from the nanotemplate, and the separated alloy nanowires may be annealed.

According to an embodiment, in step 220 of the method of fabricating cobalt-tungsten alloy nanowires according to an embodiment, a cobalt-tungsten intermetallic compound may be formed through annealing, thereby reducing electrical resistivity of the formed alloy nanowires.

According to an embodiment, in step 220 of the method of fabricating cobalt-tungsten alloy nanowires according to an embodiment, the formed alloy nanowires may be annealed at 25° C. to 600° C., preferably at 600° C.

That is, in the method of fabricating cobalt-tungsten alloy nanowires according to an embodiment, the cobalt-tungsten alloy nanowires formed to have an amorphous structure may be annealed, thereby reducing electrical resistivity of the cobalt-tungsten alloy nanowires having an amorphous structure.

Meanwhile, the method of fabricating cobalt-tungsten alloy nanowires according to an embodiment may further include a step of forming a nanotemplate.

More particularly, in the method of fabricating cobalt-tungsten alloy nanowires according to an embodiment, at least one nano-porous track may be formed on a template material and a working electrode layer may be formed on one side surface of the template material on which the nano-porous track has been formed, so as to form a nanotemplate.

For example, the nanotemplate includes a polycarbonate membrane or anodic aluminum oxide, and the working electrode layer may be at least one of a silver (Ag) electrode and a gold (Au) electrode, preferably may be realized using a silver (Ag) electrode.

According to an embodiment, the anodic aluminum oxide may be a porous substrate prepared by oxidizing aluminum using a predetermined acidic solution, and the working electrode layer may be deposited on the polycarbonate membrane or the anodic aluminum oxide using an e-beam evaporator.

FIGS. 3A to 3D illustrate an example of a method of fabricating cobalt-tungsten alloy nanowires according to an embodiment.

In other words, FIGS. 3A to 3D illustrate an example of a method of fabricating the cobalt-tungsten alloy nanowires according to the embodiment described with reference to FIG. 2, and thus, contents described in FIG. 2 are omitted in describing FIGS. 3A to 3D.

Referring to FIGS. 3A to 3D, in step 310 of the method of fabricating cobalt-tungsten alloy nanowires according to an embodiment, a template material 311 may be formed to have at least one nano-porous track to form nanotemplates 311 and 321.

For example, the nanotemplates 311 and 321 may include a polycarbonate membrane (PCM) or anodic aluminum oxide (AAO).

In addition, in step 310 of the method of fabricating cobalt-tungsten alloy nanowires according to an embodiment, regions, in which cobalt-tungsten (Co—W) alloy nanowires 331 are to be formed, of the template material 311 are etched, thereby forming nano-porous tracks.

In step 320 of the method of fabricating cobalt-tungsten alloy nanowires according to an embodiment, a working electrode layer 321 is formed on one side surface of the template material 311 in which nano-porous tracks have been formed, thereby completing the nanotemplates 311 and 321.

For example, in step 320 of the method of fabricating cobalt-tungsten alloy nanowires according to an embodiment, silver (Ag) may be deposited to a thickness of 300 nm on one side surface of the template material 311, in which nano-porous tracks have been formed, using an e-beam evaporator.

Here, the deposited silver (Ag) may be used as a working electrode to perform an electroplating method, and a platinum (Pt) electrode plate may be used as a counter electrode.

In step 330 of the method of fabricating cobalt-tungsten alloy nanowires according to an embodiment, cobalt-tungsten alloy nanowires 331 may be formed on the nanotemplates 311 and 321 using an electroplating method.

For example, in step 330 of the method of fabricating cobalt-tungsten alloy nanowires according to an embodiment, the cobalt-tungsten alloy nanowires 331 may be formed on the nanotemplates 311 and 321 by an electroplating method in which a deionized water-based solution including cobalt sulfate heptahydrate ($CoSO_4 \cdot 7H_2O$; 0.20 M) and sodium tungstate heptahydrate ($Na_2WO_4 \cdot 7H_2O$; 0.10 or 0.20 M) which are precursors is used.

In addition, the deionized water-based solution may further include boric acid ($H_3BO_3$; 0.65 M) and citric acid ($C_6H_8O_7$; 0.04 M), which are buffers, and sodium citrate tribasic dihydrate ($C_6H_7Na_3O_8$; 0.25 or 0.50 M) which is an additive.

In addition, in step 330 of the method of fabricating cobalt-tungsten alloy nanowires according to an embodiment, a current density of 1.25 mA/cm$^2$ to 5.00 mA/cm$^2$ may be applied to simultaneously reduce cobalt and tungsten.

Meanwhile, in step 330 of the method of fabricating cobalt-tungsten alloy nanowires according to an embodiment, the grain structure of the alloy nanowires may be controlled according to the content of tungsten.

According to an embodiment, in step 330 of the method of fabricating cobalt-tungsten alloy nanowires, the grain structure of the alloy nanowires may be controlled to have an amorphous-like structure when the content of tungsten is 25.1 at. %.

In addition, in step 330 of the method of fabricating cobalt-tungsten alloy nanowires according to an embodiment, the grain structure of the alloy nanowires may be controlled to have a mixed structure including an amorphous-like structure and a polycrystalline structure when the content of tungsten is 15.8 at. % to 19.1 at. %.

According to an embodiment, in step 330 of the method of fabricating cobalt-tungsten alloy nanowires, the content of tungsten may be controlled by adjusting at least one of a tungsten precursor concentration and a current density.

Preferably, in step 330 of the method of fabricating cobalt-tungsten alloy nanowires according to an embodiment, the content of tungsten may be controlled by adjusting both the deionized water-based solution including a tungsten precursor and a current density.

In particular, according to the following Table 1 in which synthesis conditions by cobalt-tungsten composition are summarized, the content of tungsten may be controlled by adjusting the concentrations of sodium tungstate heptahydrate ($Na_2WO_4 \cdot 7H_2O$), as a tungsten precursor material, and sodium citrate tribasic dihydrate ($C_6H_7Na_3O_8$), as an additive, and a current density in step 330 of the method of fabricating cobalt-tungsten alloy nanowires according to an embodiment.

TABLE 1

| \multicolumn{4}{c}{Experimental conditions} | | | |
|---|---|---|---|
| $Na_2WO_4$ (mol $L^{-1}$) | $C_6H_7Na_3O_8$ (mol $L^{-1}$) | Current density (mA/cm$^2$) | W-content (at. %) |
| 0.00 | 0.00 | 1.25 | 0.0 |
| 0.10 | 0.25 | 1.25 | 3.5 |
| 0.10 | 0.25 | 5.00 | 7.5 |
| 0.10 | 0.50 | 1.25 | 8.5 |
| 0.10 | 0.50 | 5.00 | 15.8 |
| 0.20 | 0.50 | 1.25 | 19.1 |
| 0.20 | 0.50 | 5.00 | 25.1 |

Preferably, in step 330 of the method of fabricating cobalt-tungsten alloy nanowires according to an embodiment, the content of tungsten may be controlled to 25.1 at. % by adjusting the concentration of sodium tungstate heptahydrate ($Na_2WO_4 \cdot 7H_2O$) to 0.20 mol $L^{-1}$, by adjusting the concentration of sodium citrate tribasic dihydrate ($C_6H_7Na_3O_8$) to 0.50 mol $L^{-1}$, and by adjusting a current density to 5.00 mA/cm$^2$. Accordingly, the grain structure of the cobalt-tungsten alloy nanowires may be controlled to have an amorphous-like structure.

In step 340 of the method of fabricating cobalt-tungsten alloy nanowires according to an embodiment, the alloy nanowires 331 may be separated from the nanotemplates 311 and 321.

For example, in step 340 of the method of fabricating cobalt-tungsten alloy nanowires according to an embodiment, a working electrode 321 may be removed with an adhesive tape, and the template material 311 including the alloy nanowires 331 may be selectively removed with a dichloromethane solution ($CH_2Cl_2$), followed by washing with a chloroform solution ($CHCl_3$) and acetone five or more times through a centrifuge. As a result, the alloy nanowires 331 present inside the template material 311 may be separated.

According to an embodiment, in step 340 of the method of fabricating cobalt-tungsten alloy nanowires according to an embodiment, the template material 311 may be selectively removed by stirring for about 15 minutes using 3 M sodium hydroxide (NaOH).

In step 340 of the method of fabricating cobalt-tungsten alloy nanowires according to an embodiment, the separated alloy nanowires 331 may be annealed.

According to an embodiment, in step 340 of the method of fabricating cobalt-tungsten alloy nanowires according to an embodiment, the formed alloy nanowires may be annealed at 25° C. to 600° C.

Preferably, in step 340 of the method of fabricating cobalt-tungsten alloy nanowires according to an embodiment, the alloy nanowires 331 may be annealed at 600° C.

FIGS. 4A to 4H illustrates HRTEM and SAED images of cobalt-tungsten alloy nanowires according to an embodiment.

FIGS. 4A to 4H illustrate high-resolution transmission electron microscope (HRTEM) images and selected-area electron diffraction (SAED) images of cobalt-tungsten alloy nanowires with a diameter of 130 nm formed using various tungsten contents.

In particular, FIGS. 4A and 4B illustrate images of cobalt nanowires in which the content of tungsten is 0.0 at. %, FIGS. 4C and 4D illustrate images of cobalt-tungsten alloy nanowires in which the content of tungsten is 3.5 at. %, FIGS. 4E and 4F illustrate images of cobalt-tungsten alloy nanowires in which the content of tungsten is 7.5 at. %, and FIGS. 4G and 4H illustrate images of cobalt-tungsten alloy nanowires in which the content of tungsten is 25.1 at. %.

From FIGS. 4A to 4H, it can be confirmed that, as a tungsten content in the cobalt-tungsten alloy nanowires increases, interatomic spacing increases and amorphous nanowires are synthesized.

More particularly, from SAED images of FIGS. 4C, 4E and 4G, it can be confirmed that the cobalt-tungsten alloy nanowires in which the content of tungsten is 3.5 at % have a polycrystalline structure and thus have lower crystallinity and smaller particle size than pure cobalt nanowires, and the cobalt-tungsten alloy nanowires in which the content of tungsten reaches 15.8 at % have both a nano-crystalline structure (amorphous-like structure) and a polycrystalline structure.

In addition, the cobalt-tungsten alloy nanowires in which the content of tungsten reaches 15.8 at % exhibit a blurry ring pattern as shown in FIG. 4G, which indicates that the nanowires have a nano-crystalline structure (amorphous-like structure) and thus are amorphous.

FIGS. 5A to 5D illustrates XRD analysis results of cobalt-tungsten alloy nanowires according to an embodiment.

Referring to FIGS. 5A to 5D, FIG. 5A illustrates an x-ray diffraction (XRD) pattern of cobalt-tungsten alloy nanowires, FIG. 5B illustrates peak position changes dependent upon tungsten content changes in cobalt-tungsten alloy nanowires, FIG. 5C illustrates (002) interplanar distance changes dependent upon tungsten content changes in cobalt-tungsten alloy nanowires, and FIG. 5D illustrates grain size changes, which are derived from XRD analysis, dependent upon tungsten content changes in cobalt-tungsten alloy nanowires.

From FIG. 5A, it can be confirmed that both the cobalt-tungsten alloy nanowires according to an embodiment and pure cobalt nanowires have an hcp structure.

In particular, it can be confirmed that the pure cobalt nanowires exhibit a crystalline hcp structure and a strong hcp (002) texture, and the cobalt-tungsten alloy nanowires according to an embodiment exhibit a crystalline hcp structure, similar to the pure cobalt nanowires, and an hcp (002) texture until the content of tungsten increases to 8.5 at %.

In addition, it can be confirmed that the 20 value of the cobalt-tungsten alloy nanowires according to an embodiment changes in response to changes in the tungsten content when the content of tungsten changes within a range of 3.5 at % to 8.5 at %.

The shift of an XRD peak position of the cobalt-tungsten alloy nanowires according to an embodiment may occur as a result of incorporating tungsten into a cobalt lattice and forming a substitution alloy.

An average distance ($d_{avg}$) between two adjacent atoms may be derived from the following Equation 1:

$$d_{avg}=2[r_{Co}+(r_W-r_{Co}) \cdot X_w]$$ [Equation 1]

wherein $r_{co}$ and $r_w$ respectively represent the radii of cobalt and tungsten atoms, and $X_w$ represents an atomic fraction of tungsten.

In addition, a peak position of XRD may be derived from the Bragg equation of the following Equation 2:

$$d_{avg} = \frac{\lambda}{2\sin\theta}$$ [Equation 2]

wherein 2θ represents a peak position, and λ represents Cu Kα wavelength.

When tungsten composed of larger atoms enters cobalt which is a host element, significant stress is generated around the host element, which greatly affects electrical properties. In particular, as the content of introduced tungsten (the number of atoms) increases, an average distance ($d_{avg}$) may increase when a substituted cobalt-tungsten alloy is formed.

In other words, in the case of the cobalt-tungsten alloy nanowires according to an embodiment, it can be confirmed that, as the number of introduced tungsten atoms increases, an average distance ($d_{avg}$) between two adjacent atoms increases when a substituted cobalt-tungsten alloy is formed, resulting in movement of the XRD peak position to a smaller angle.

Referring to FIG. 5B, diffraction peaks of hcp Co(W) (002) are observed at 44.5°, 44.3°, 44.1° and 44° at tungsten contents of 0.0 at %, 3.5 at %, 7.5 at % and 8.5 at %, respectively.

Referring to FIG. 5C, it can be confirmed that the interplanar distance d(002) calculated from the XRD pattern linearly increases with increasing content of tungsten, and the increased d(002) value may indicate an increase in electrical resistivity.

FIG. 5D illustrates grain sizes calculated using the Scherrer equation. From FIG. 5D, it can be confirmed that a grain size of the cobalt-tungsten alloy nanowires according to an embodiment is 38.2 nm when the content of cobalt is 0 at. %, and the grain size is reduced with increasing content of tungsten. Meanwhile, the cobalt-tungsten alloy nanowires according to an embodiment may exhibit an amorphous-like structure when the grain size is smaller than 5 nm.

That is, it can be confirmed that the grain size of the cobalt-tungsten alloy nanowires according to an embodiment is reduced with increasing content of tungsten. Particularly, it can be confirmed that, when the content of tungsten is 25.1 at. %, the grain size is reduced to 4 nm or less and thus an amorphous-like structure (nano-crystalline structure) is exhibited.

FIGS. 6A to 6E illustrates annealing temperature-dependent crystallinity characteristic changes of cobalt-tungsten alloy nanowires according to an embodiment.

Referring to FIGS. 6A to 6E, FIG. 6A illustrates annealing temperature-dependent XRD analysis results of the cobalt-tungsten alloy nanowires when the content of tungsten is 25.1 at. %, and FIGS. 6B to 6E illustrate SAED patterns of the cobalt-tungsten alloy nanowires when annealing is nor performed, when annealing is performed at 400° C., when annealing is performed at 500° C. and annealing is performed at 600° C.

Referring to FIG. 6A, cobalt-tungsten intermetallic compounds may be formed and thus electrical resistivity may be reduced when the cobalt-tungsten alloy nanowires according to an embodiment are annealed at 600° C. Here, the intermetallic compounds may correspond to an XRD peak position.

Here, the intermetallic compounds may be observed at 2θ of 40.70°±0.3°, 43.88°±0.3° and 46.46°±0.3°.

More particularly, it can be confirmed that, when the cobalt-tungsten alloy nanowires according to an embodiment are annealed at 400° C., a single broad XRD peak and a nano-crystalline structure having reduced crystallinity are observed.

On the other hand, when the cobalt-tungsten alloy nanowires according to an embodiment are annealed at 600° C., crystallization of the $Co_3$ W phase occurs and diffraction patterns of polycrystalline hcp $Co_3$ W are observed, and crystallinity is significantly improved.

In addition, it can be confirmed that, when the cobalt-tungsten alloy nanowires according to an embodiment are annealed at 600° C., a grain size significantly increases to 19.7 nm. This means that $Co_3$ W alloy nanowires are formed after a deposited state present in a solid dissolution state is subjected to heat treatment, which contributes to reduction of internal stress and low resistivity.

Annealing temperature-dependent grain sizes and microstrains of the cobalt-tungsten alloy nanowires may be derived as in the following Table 2.

TABLE 2

| Annealing temperature (° C.) | Grain size, D (nm) | Microstrain, ε (×10⁻²) |
|---|---|---|
| As-deposited | 2.24 | 4.12 |
| 400 | 2.94 | 3.12 |
| 500 | 3.77 | 2.43 |
| 600 | 19.7 | 0.54 |

From FIGS. 6A to 6E and Table 2, it can be confirmed that annealing temperature-dependent electrical resistivity changes of the cobalt-tungsten alloy nanowires according to an embodiment are inversely proportional to grain sizes.

In particular, it can be confirmed from FIG. 7D described below that resistivity values of the cobalt-tungsten alloy nanowires according to an embodiment are reduced to 128.0 μΩ·cm and 120.0 μΩ·cm after being annealed at 400° C. and 500° C., and a resistivity value is significantly reduced to 87.5 μΩ·cm after being annealed at 600° C. Such resistivity value reduction after annealing may be caused by a grain size increase and release of residual stress.

In addition, it can be confirmed that the microstrain of the cobalt-tungsten alloy nanowires according to an embodiment is also significantly reduced from 4.12 ($10^{-2}$) to 0.54($10^{-2}$).

FIGS. 7A to 7D illustrates electrical property changes dependent upon compositions, nanowire diameters and annealing temperature of cobalt-tungsten alloy nanowires according to an embodiment.

Referring to FIGS. 7A to 7D, FIG. 7A illustrates a current (I)-voltage (V) curve of cobalt-tungsten alloy nanowires in which the content of tungsten is 3.5 at. %, FIG. 7B illustrates a tungsten content change-dependent electrical resistivity change in cobalt-tungsten alloy nanowires, FIG. 7C illustrates diameter change-dependent electrical resistivity changes in cobalt-tungsten alloy nanowires in which the contents of tungsten are respectively 0.0 at. %, 7.5 at. % and 25.1 at. %, and FIG. 7D illustrates an annealing temperature change-dependent electrical resistivity change in cobalt-tungsten alloy nanowires in which the content of tungsten is 25.1 at. %.

As shown in FIG. 7A, the current of the cobalt-tungsten alloy nanowires linearly increases according to voltage, and a resistivity value calculated through the I-V curve was 81 µΩ·cm.

In addition, from FIG. 7B, it can be confirmed that the cobalt-tungsten alloy nanowires in which the content of cobalt is 0 at. % exhibits a resistivity value of 9.4 µΩ·cm, the cobalt-tungsten alloy nanowires in which the content of cobalt is 3.5 at. % exhibits a rapidly increased resistivity value of 72.3 µΩ·cm, and a resistivity value increases up to 133.8 µΩ·cm when the content of cobalt finally increases up to 25.1 at. %.

That is, the resistivity value of the cobalt-tungsten alloy nanowires tends to continuously increase with increasing content of tungsten. However, the highest resistivity value thereof is confirmed to be lower than that of a TaN material (160 µΩ·cm to 400 µΩ·cm).

From FIG. 7C, it can be confirmed that the resistivity of the cobalt-tungsten alloy nanowires according to an embodiment increases with decreasing diameter thereof regardless of the tungsten content. In particular, it can be confirmed that the resistivity value increases to 170 µΩ·cm when the content of tungsten is 25.1 at. % and the diameter is 30 nm.

However, it can be confirmed that the cobalt-tungsten alloy nanowires according to an embodiment have still a lower resistivity value than that of a TaN material (500 µΩ·cm to 1,000 µΩ·cm; thickness: 30 nm).

From FIG. 7D, it can be confirmed that the resistivity value of the cobalt-tungsten alloy nanowires according to an embodiment gradually decreases as an annealing temperature increases up to 500° C., and the resistivity value is significantly reduced from 120.0 µΩ·cm to 87.5 µΩ·cm when heat-treated at 600° C.

FIGS. 8A to 8C illustrates an application example of cobalt-tungsten alloy nanowires according to an embodiment.

Referring to FIGS. 8A to 8C, FIG. 8A illustrates a semiconductor device 800 including a back end of line (BEOL) layer and a front end of line (FEOL) layer, FIG. 8B illustrates a metal line 810 and via 820 included in the BEOL layer of the semiconductor device 800, and FIG. 8C illustrates a metal line 810 including a metal layer 811, a liner 812, a barrier 813 and a dielectric 814.

For example, devices denoted by reference numeral 830 illustrated in FIG. 8B may be transistor elements, and the metal layer 811 may include at least one metal of copper, cobalt and tungsten.

In particular, the cobalt-tungsten alloy nanowires according to an embodiment may be applied in the form of at least one of a barrier and a liner with respect to at least one of the metal line 810, via 820 and contact included in the BEOL layer of the semiconductor device 800.

For example, the cobalt-tungsten alloy nanowires according to an embodiment may be applied in the form of the liner 812 and barrier 813 formed on the metal layer 811 of the metal line 810.

In other words, the cobalt-tungsten alloy nanowires according to an embodiment may replace a conventional Ta liner and TaN barrier formed on copper metal wiring, thereby preventing rapid resistance increase in the copper metal wiring and thus reducing the thickness of a barrier/liner bilayer.

In conclusion, the present disclosure provides cobalt-tungsten alloy nanowires having an amorphous structure and low electrical resistivity using an electroplating method.

In addition, the present disclosure provides cobalt-tungsten alloy nanowires that serve as a barrier for preventing diffusion into a low-k dielectric of metal wiring and a liner for metal wiring plating and, accordingly, are used in the form of a single layer in a metal wiring process.

In accordance with an embodiment, the present disclosure can provide cobalt-tungsten alloy nanowires having an amorphous structure and low electrical resistivity using an electroplating method.

In addition, the present disclosure can provide cobalt-tungsten alloy nanowires that serve as a barrier for preventing diffusion into a low-k dielectric of metal wiring and a liner for metal wiring plating and, accordingly, are used in the form of a single layer in a metal wiring process.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A method of fabricating cobalt-tungsten alloy nanowires, the method comprising:
   forming cobalt-tungsten (Co—W) alloy nanowires on a nanotemplate using an electroplating method; and
   annealing the formed alloy nanowires,
   wherein, in the forming, a grain structure of the alloy nanowires is controlled according to a content of tungsten,
   wherein a content of tungsten in the cobalt-tungsten alloy nanowires is 25.1 at. % to control the grain structure of the alloy nanowires to have an amorphous-like structure,
   wherein, in the forming, the cobalt-tungsten alloy nanowires are formed using the electroplating method in an environment, in which a current density of 5.00 mA/cm$^2$ is applied to simultaneously reduce cobalt and the tungsten,
   wherein the content of tungsten is controlled by using a deionized water-based solution comprising cobalt sulfate heptahydrate (CoSO$_4$·7H$_2$O), sodium tungstate heptahydrate (Na$_2$WO$_4$·7H$_2$O), boric acid (H$_3$BO$_3$), citric acid (C$_6$H$_8$O$_7$), and sodium citrate tribasic dihydrate (C$_6$H$_7$Na$_3$O$_8$), and
   wherein concentrations of the sodium tungstate heptahydrate (Na$_2$WO$_4$·7H$_2$O) and the sodium citrate tribasic dihydrate (C$_6$H$_7$Na$_3$O$_8$) are 0.20 mol/L and 0.50 mol/L, respectively.

2. The method according to claim 1, wherein, in the annealing, a cobalt-tungsten intermetallic compound is formed through the annealing and thus electrical resistivity of the Co—W alloy nanowires is reduced.

3. The method according to claim 1, wherein the annealing is performed at 400° C. to 600° C.

4. The method according to claim 1, wherein the nanotemplate comprises a polycarbonate membrane (PCM) or anodic aluminum oxide (AAO) and at least one nano-porous track is formed in the nanotemplate.

5. The method according to claim 1, further comprising separating the annealed alloy nanowires from the nanotemplate.

6. A method of fabricating cobalt-tungsten alloy nanowires, the method comprising:
forming cobalt-tungsten (Co—W) alloy nanowires on a nanotemplate using an electroplating method; and
annealing the formed alloy nanowires,
wherein, in the forming, a grain structure of the alloy nanowires is controlled according to a content of tungsten,
wherein a content of tungsten in the cobalt-tungsten alloy nanowires is 15.8 at. % to 19.1 at. % to control the grain structure of the alloy nanowires to have an amorphous-like structure,
wherein, in the forming, the cobalt-tungsten alloy nanowires are formed using the electroplating method in an environment, in which a current density of 1.25 mA/cm$^2$ to 5.00 mA/cm$^2$ is applied to simultaneously reduce cobalt and the tungsten,
wherein the content of tungsten is controlled by using a deionized water-based solution comprising cobalt sulfate heptahydrate ($CoSO_4 \cdot 7H_2O$), sodium tungstate heptahydrate ($Na_2WO_4 \cdot 7H_2O$), boric acid ($H_3BO_3$), citric acid ($C_6H_8O_7$), and sodium citrate tribasic dihydrate ($C_6H_7Na_3O_8$), and
wherein concentrations of the sodium tungstate heptahydrate ($Na_2WO_4 \cdot 7H_2O$) and the sodium citrate tribasic dihydrate ($C_6H_7Na_3O_8$) are 0.10 mol/L to 0.20 mol/L and 0.50 mol/L, respectively.

7. The method according to claim 6, wherein, in the annealing, a cobalt-tungsten intermetallic compound is formed through the annealing and thus electrical resistivity of the Co—W alloy nanowires is reduced.

8. The method according to claim 6, wherein the annealing is performed at 400° C. to 600° C.

9. The method according to claim 6, wherein the nanotemplate comprises a polycarbonate membrane (PCM) or anodic aluminum oxide (AAO) and at least one nano-porous track is formed in the nanotemplate.

10. The method according to claim 6, further comprising separating the annealed alloy nanowires from the nanotemplate.

* * * * *